United States Patent [19]

Turner

[11] 4,337,503

[45] Jun. 29, 1982

[54] HANDLEBAR MOUNTED DETACHABLE BICYCLE LIGHT FIXTURE

[76] Inventor: Samuel Turner, 525 Atlanta Ave., Massapequa, N.Y. 11758

[21] Appl. No.: 216,670

[22] Filed: Dec. 15, 1980

Related U.S. Application Data

[63] Continuation-in-part of Ser. No. 108,420, Dec. 31, 1979.

[51] Int. Cl.³ ............................................. F21V 33/00
[52] U.S. Cl. .................................... 362/72; 362/191; 362/217; 362/221; 362/396
[58] Field of Search ................. 362/72, 191, 217, 221, 362/396

[56] References Cited

U.S. PATENT DOCUMENTS 2,416,160  2/1947  Davidsson ............................. 362/72
4,088,882  5/1978  Lewis ..................................... 362/72

Primary Examiner—Irwin Gluck
Attorney, Agent, or Firm—Robert L. Slater, Jr.

[57] ABSTRACT

A means for providing illumination for a bicycle, tricycle, moped, motorcycle or other velocipede, said illumination means being removable from said vehicle when not in use. The light fixture thus provided is detachably mounted to the handlebars of existing bicycles and serves to illuminate both the rider and the path traveled.

12 Claims, 12 Drawing Figures

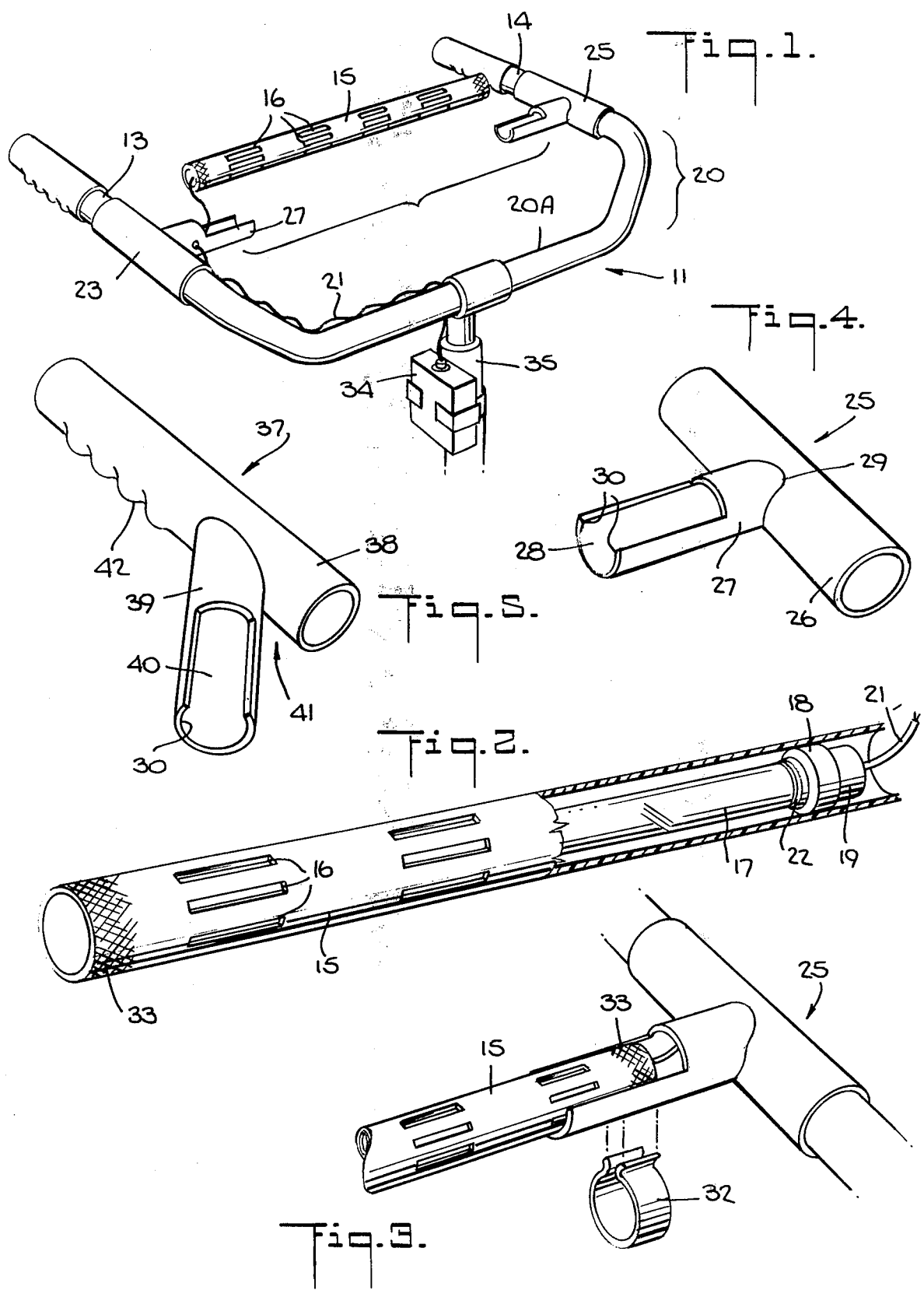

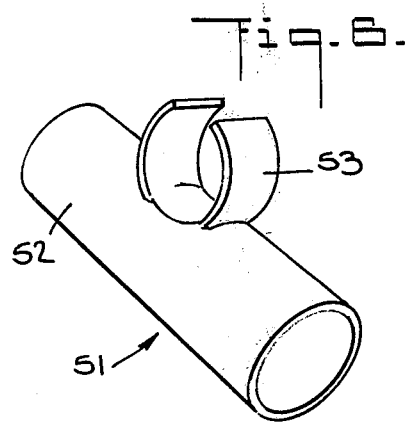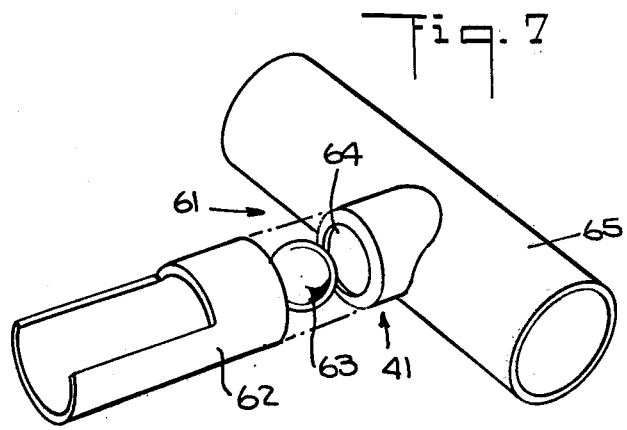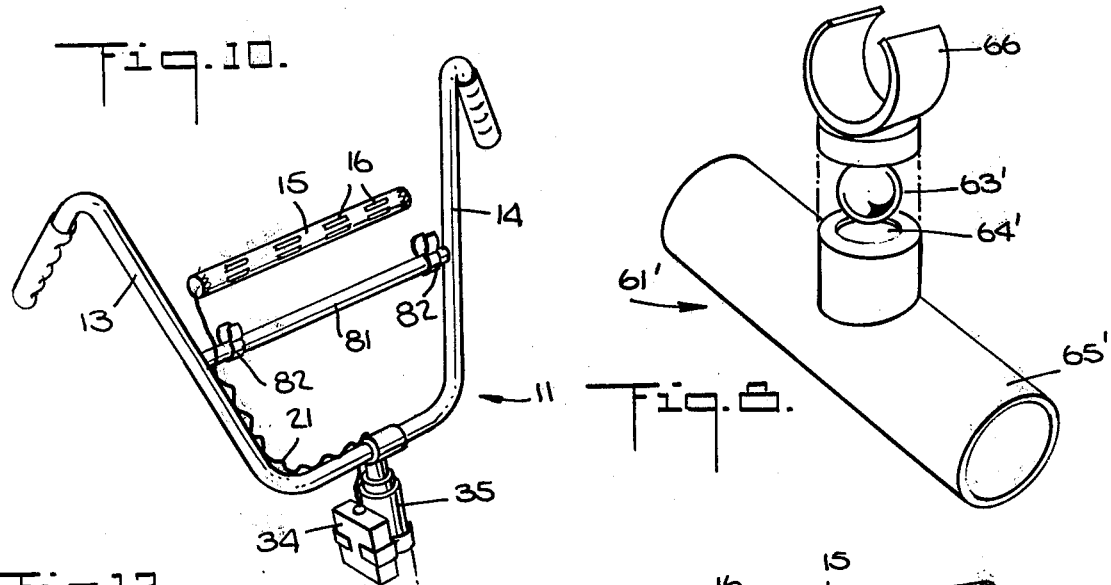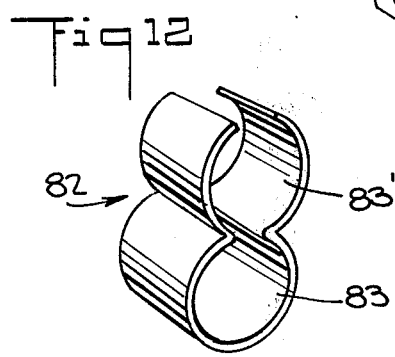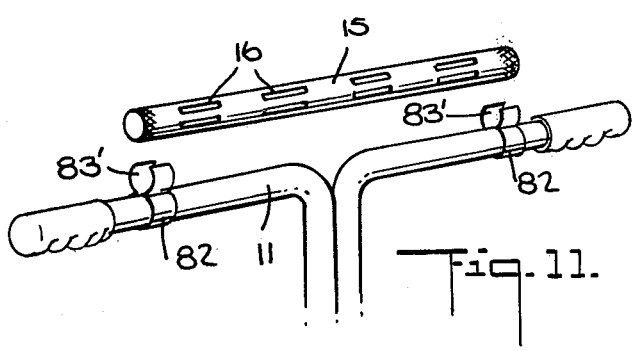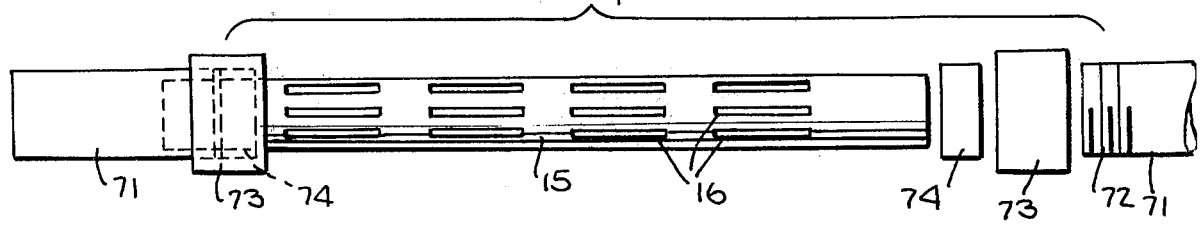

HANDLEBAR MOUNTED DETACHABLE BICYCLE LIGHT FIXTURE

CROSS REFERENCE TO COPENDING APPLICATION

This application is a continuation-in-part of copending application Ser. No. 108,420 filed Dec. 31, 1979.

FIELD OF INVENTION

The present invention relates to a means for providing illumination for a bicycle, tricycle, moped, motorcycle or other velocipede, said illumination means being removable from said vehicle when it is not in use. The light fixture thus provided is detachably mounted to the handlebars of existing bicycles and serves to illuminate both the rider and the path traveled.

PRIOR ART

Bicycles in current use are illuminated with a single headlight unitarily connected to the handlebar of the bicycle. Examples of such headlight means are illustrated in U.S. Ser. No. 506,477 to Davies, U.S. Pat. No. 2,169,256 to Kraeft, and British Pat. No. 614,413. A dual headlight is shown in U.S. Pat. No. 1,994,837 to Onge. Wintermantel U.S. Pat. No. 2,944,833 illustrated that a headlight and a taillight as well as side lights may be installed in a tricycle frame. Lewis U.S. Pat. No. 4,088,822 shows bicycle illumination attachable to the frame. However, the light provided by Lewis does not illuminate the roadway, and serves only the purpose of providing an added safety factor to the rider. In addition, Lewis' device is not attachable to the myriad sized and shaped handlebars in use currently.

SUMMARY OF INVENTION

It is an object of this invention to provide detachable illumination means attachable to the handlebar or a bicycle or other velocipede.

It is another object of this invention to illuminate both rider and the roadway with a shower of light.

It is also an object of this invention to provide such illumination as described as an additional safety feature and using an unbreakable plastic fluorescent bulb.

Another object of this invention is to provide a light fixture which is adaptable to bicycles already in existence and attachable to a wide variety of different handlebar sizes and shapes through adjustable handlebar attachment means.

Yet another object of this invention is to provide illumination of different colors to rider and roadway, if desired, or to either the front or rear to the bicycle.

These and other features and advantages of the invention will be more fully understood from an inspection of the specification, drawings and claims.

In summary the preferred embodiment of the invention comprises an unbreakable plastic fluorescent bulk housed within a hollow cylindrical tube, the bulb being secured therein by resilient mounting adapters engaging each end of the bulb. The housing is supported between opposed sides of the handlebar by resilient T-shaped or Y-shaped supporting members, the stem or branch portion thereof extending inwardly with respect to the handlebar and facing each other. The stem is preferably hemicylindrically shaped but has an arc of greater than 180 degree, and a diameter essentially equal to the diameter of the housing which when placed atop the stems, is clipable thereon.

Apertures provided around the periphery of the housing permit light emanating therefrom to illuminate both rider and path traveled. If desired, colored plastic transparent sleeves may be juxtaposed between the bulb and housing to obtain illumination of various colors.

Power is preferably provided for the bulb from a rechargeable 12 volt power pack removeable mounted to the bicycle frame, or, alternatively, from a generator converting rotational energy derived from the wheel to electric power for the bulb.

DESCRIPTION OF DRAWINGS

FIG. 1 illustrates one form of a standard handlebar employing the preferred embodiment of the present invention.

FIG. 2 is a perspective view of the housing used in the preferred embodiment of FIG. 1 in partial section thereby showing the installation of the fluorescent bulb therein.

FIG. 3 is an optional clip for mounting the housing to the handlebar mounts.

FIG. 4 is one embodiment of the housing handlebar mount.

FIG. 5 is a second embodiment of the housing handlebar mount for use with diverging handlebars.

FIG. 6 is a third embodiment of the housing handlebar mount for use with planar handlebars.

FIG. 7 is an alternate embodiment of the mount of FIG. 4 which is adaptable for handlebars of several configurations.

FIG. 8 is an alternate of the handlebar mount of FIG. 6 and can be used with diverging and/or planar handlebar constructions.

FIG. 9 is a partially exploded front view of an alternate embodiment of the housing shown in FIG. 3 and having an adjustable length.

FIG. 10 is an alternate embodiment of the invention for use on handlebar having a reinforcing rod.

FIG. 11 shows the embodiment of FIG. 10 on a linear handlebar construction.

FIG. 12 illustrates the mounting means used with embodiments of FIGS. 10 and 11.

DETAILED DESCRIPTION OF INVENTION

Referring of FIG. 1, a standard handlebar 11 is shown with the present invention 12 attached thereto. It is to be understood that the handlebar 11 is but one of many designs employed currently by bicycle manufacturers and that the embodiment 12 of the removable bicycle illuminator can be varied, as will be shown below for most, if not all, of these designs. Unlike the copending application Ser. No. 108,420 wherein the illumination means were housed permanently within the handlebar itself, the illumination means of the embodiments of my invention described within this continuation-in-part application is provided for bicycles currently in use. As such, it is desirable that the illuminator be removable easily. The invention described herein is most conveniently fabricated for sale as a kit to allow owners of bicycles to install the light on their bicycles. Although in some instances a kit may be required to be specially adapted to a particular make and model of a manufacturer, the preferred designs will be readily installed by a simple mechanical procedure to all bicycle handlebars. It is to be further understood that the present invention is applicable to all velocipedes even though it is described herein as it relates to bicycles.

The invention 12 comprises and unbreakable fluorescent light 17 contained in a housing 15, said housing being provided with a multiplicity of apertures 16 from which the light emanates. As seen best in FIG. 2, a partial sectional view of the housing 15, the fluorescent bulb 17 is secured within the housing 15 by a pair of mounting adapters 18 (one shown) which are slidably mountable over the ballast ends 19 of the bulb 17. The fluorescent bulb 17 provided with the invention is an unbreakable plastic bulb, and has been used as a hand held search light. It is currently commercially available. It has bakelite or other impervious plastic ends or ballast members 19 from which a connecting wire 21 extends at one end. The mounting adapters 18 are fabricated from a resilient material such as foam rubber or polyurethane and compress sufficiently to allow the adapter 18-bulb 17 assembly to slide into the housing 15. Preferably the bulb 17 is fabricated so that the ballast portion proximate to the bulb portion has a lip 22 so that the mounting adapter remains on the ballast portion 19 at all times, and does not slide over the bulb portion.

The apertures 16 in the housing 15 can be slot, slits, or holes of any configuration. It is preferred that they extend about the circumference of the housing whereby light emanating therefrom illuminates both rider and roadway. However, it may be desired to have the apertures 16 facing in one direction only. An optional feature, not shown, is to provide one or more transparent colored plastic inserts or sleeves surrounding the light so that colored illumination is obtained. These inserts can be arched sheets or tubular in configuration. Differently colored light may be provided for the road and the rider. Finally, lest moisture accumulate in the housing, drainage holes may be provided in the bottom thereof, and the ends may be capped. Of course, the bulb itself is completely sealed and impervious to water.

Referring again to FIG. 1, the housing 15 within which the bulb 17 has been attached to resilient handlebar mounts 23 and 25. FIG. 4 shows the handlebar mount 25 used on the left-hand side of the bicycle. The mount 25 is T-shaped, the "run" 26 of the mount 25 hollow and cylindrically shaped, and being snugly, slidably placed on the handlebar with the stem or "branch" 27 extending toward the interior of the bicycle and in alignment with the branch portion of mount 23. The branch 27 in this embodiment is perpendicular to the run 25 and is essentially hemicylindrical at the end 28 distal from the run-branch intersection 29. The portion 31 of the branch 27 proximate to the run 26 is conveniently cylindrical, although this is not essential. Clips 32 shown in FIG. 3 can be used to secure the housing 15 to the mounts 23 and 25, the housing ends preferably being knurled to provide a better gripping surface 33.

Preferably, however, and as illustrated in FIG. 4, the arc 30 of the hemicylindrical section 28 is somewhat greater than 180 degrees. The housing can be snapped securely into the arc of the mounts 23, 25 which are fabricated from a tough, yet resilient material, e.g., a synthetic plastic. When the mounts are fabricated according to the requirements just stated, it is not essential that the clip 32 shown in FIG. 3 be utilized. Because the distances between handlebars vary greatly among the numerous manufacturers and models on the market, the branch 28 portion should preferably extend from the run 26 a sufficient distance so that a housing component of the prefixed size can be mounted thereon. The oversized branch, if necessary, can be cut to size just prior to installation. This feature is most convenient when the apparatus disclosed herein is to be sold as a kit to bicycle owners. For most bicycle handlebars now in use the length of the branch should be about six inches, and the housing between 14 and 20 inches. Conveniently, the mounts 23, 25 can be molded, extruded or otherwise fabricated from a plastic material such as polycarbonates, polythylenes, polypropylenes, polyurethanes, polyvinyl chlorides, and the like. Natural and synthetic rubbers may also be used. The diameter of the arc 30 should be approximately the same size or slightly smaller than the diameter of the housing 15.

The light is powered by a rechargable 12 volt power pack battery 34 removably clipped to the steerer rod 35 or another part of the bicycle frame. An electric wire 21 runs from the bulb 17 which is inside the housing 15 to the power source. While it is more convenient to run the wire along the outside of the handlebar 11, the wire 21 could be "snaked" through the handlebar if holes are provided therein for that purpose.

In FIG. 1 the handlebar used for illustrating the present invention has essentially parallel sides 13 and 14. Many handlebar designs, however, have diverging sides 13 and directly with the housing 15. Because the flared or diverging type of handlebar construction is more or less uniform within the industry, the Y-shaped mount 37 of FIG. 5 having a standardized configuration can be used therewith. FIG. 5 shows the mount for use on the left-hand side of the bicycle, the right side mount being a mirror image of the mount 37. It is evident that the fixed angle 41 between the run 38 and branch 39 will be adapted to each handlebar on an individual basis. However, the standardization to handlebars among manufacturers allows for standardization of the mounts for a particular model handlebar. When placed in the diverging sides of the handlebar, the Y-mounts permit placement of the housing 15 parallel to the front of the handlebar, that is, perpendicular to the rider. Again, the Y-mount 37 may have a hemicylindrical section whose arc 30 is somewhat greater than 180 degrees to facilitate a snug clip-on fit. Of course, it is also possible to use the T-shape mounts with the diverging type handlebar, provided that the ends of the housing 15 are mitered to fit into the branch portions of the mounts. This method is undersirable because the fabrication of the housing is complicated thereby, adding additional manufacturing costs. Further, at least one mitered end would necessarily be removable to permit removal of the bulb. Because the mounts are preferably of molded fabrication, the cost associated with making several, albeit standard, mount designs is not severe.

The mount 37 shown in FIG. 5 also illustrates another optional feature of the invention. At one end, a handlebar grip portion 42 is provided unitary with the run of the mount 37. This mount can be used where the placement of the light will be relatively proximate to the ends of the handlebar and hence proximate to the rider.

Unlike the handlebar of FIG. 1, some handlebars do not have the upwardly extending section indicated in FIG. 1 by numeral 20. Thus, the sides 13, 14 of a handlebar would be coplanar with the front portion 20A. Using the T or Y-shaped mount with a planar type handlebar is disadvantageous because the front of the handlebar will interfere with the light from the housing. FIG. 6 shows an embodiment of a mount 51 adapted for planar handlebars. The run 52 of the mount is identical to embodiments shown in FIG. 4 and 5. An upwardly projecting socket or saddle 52 preferably unitary with said mount permits attachment of the housing above the front portion of the handlebar. The clip portion 52 may take on a variety of shapes, although a cylindrical configuration extending somewhat more than 180 degrees would appear to offer the greatest support. Of course the socket 53 may be of separate construction, and screw mounted into run 52.

It should be understood that the mounts 25,37,51 fit snugly onto the handlebar, yet are resilient and can be maneuvered through the turns of the handlebar. Optionally, the mounts may be provided with a set screw or other similar securing device, but this is not considered to be essential.

FIGS. 7 and 8 are variations 61, 61' of mounts shown in FIGS. 4 and 6 respectively for use primarily with diverging type handlebars. In these embodiments two-piece construction is used. The end 63 of the branch member 62 is molded to have a spherical configuration and is adapted to fit into the neck 64 extending from the run member 65. Thus, the branch once inserted is capable of being positioned to form the angle 41 a moderate amount of force being required to realign the branch in relation to the run. The branch 62 is secured rigidly to the run 65 once the housing 15 is installed. Similarly, a ball and socket mount is illustrated in FIG. 8, the mount 61' shown therein being used in conjuction with the planar type handlebar mentioned above. However, the saddle portion 66 is freely rotatable within neck 64' to provide the alignment necessary for insertion of the housing 15 even though the handlebar sides 13, 14 may be diverging. The mount designs of FIGS. 7 and 8 could also be used with parallel or converging handlebar sides.

It should be appreciated that the housing provides apertures from which light emanates. Without the housing, a single beam of light would be cast. This is a possible alternate to the invention inasmuch as the bulb is unbreakable on impact, and would be supported by the mounts by the ballast portions 19. However, the housing also serves to shield the bulb from the elements. Transparent colored plastic circuits (not shown) in the form of sheets can be placed between the housing and the bulb to provide differently colored illumination if such is desired.

A housing may also be provided which is expandable along its length. Most, if not all, handlebars are designed so that the distance between the sides is approximately the distance from each shoulder of the rider. For an adult rider this would be about 20-22 inches. Children's handlebars have a width of about 14 to 16 inches. The housing 15 may therefor vary from about 14 inches to about 22 inches. This is most attractive for children who may have several bicycles of increasing size during their growing years. The housing of this embodiment is shown in FIG. 9. The right hand side is a telescoping view of the expansion section, while the left side shows the assemblage of the elements. Sleeves 71 are slidable over the housing 15 and are threaded at their interior end 72. Nut 73 and washer 74 are also slidable over the housing 15. The washer is resilient and is adapted to take up the space between housing 15 and nut 73. Once the sleeve 71 is inserted to the desired length over housing 15, the nut is tightened around the threads 72 thereon. The washer adjacent to the end of the sleeve 71 and in contact with the housing. The nut tightens and holds the sleeve and housing in place, the washer being compressed thereby. Of course, other means can be used to obtain the telescoping effect herein described. Sleeves are preferably positioned at each end of the housing to provide symetrical distribution of light from the apertures.

FIGS. 10 and 11 show two types of handlebar construction used presently and employing an embodiment of the invention. FIG. 10 shows a handlebar which has a reinforcing rod 81 welded between sides 13, 14 and of the handlebar 11. As in FIG. 1 battery pack 34 is mounted to steerer rod 35, although another portion of the frame may be used. Wire 21 extends from the battery pack 34 to the housing 15. Spring clips 82, shown more clearly in FIG. 12, have two or more superposed hemicylindrical support surfaces 83, 83' and are of unitary construction. Preferably these clips are fabricated from a spring type steel providing substantial resilience, but disinclined to fatigue. However, various plastic materials can be similarly used. One support surface, for example 83, should have a diameter approximately equivalent to the diameter of the rod 81, the housing 15 may be attached and wire 21 connected to the bulb inside the housing.

In order to provide one such clip 82 for use with all bicycles more than two support surfaces may be provided, each having a different diameter. Thus, rods of several diameters may be accomodated. Of course one diameter must be adapted to accomodate the housing 15.

FIG. 11 shows the use of the spring clips 82 with a linear type handlebar.

The foregoing description for various embodiments of my invention is intended to be merely illustrative of my invention, the scope of which is set within the following claims:

I claim:

1. A bicycle illumination device adapted for use on a bicycle handlebar comprising:
    (a) illumination means, said means positioned between the side portions of a handlebar;
    (b) a pair of resilient handlebar mounts engaging the handlebar, each mount having a support surface extending from the mount and being in alignment with one another for placement of the illumination means perpendicular to the forward movement of the bicycle, said illumination means being attached to the support surface, and
    (c) means for energizing the illumination means.

2. The device of claim 1 wherein the illumination means is an elongated unbreakable flourescent bulb having impervious ballast end members, the end members being attached to respective support surfaces extending from the mounts.

3. The device of claim 1 wherein the illumination means is an elongated unbreakable flourescent bulb having impervious ballast end members, and further comprising a hollow cylindrical housing for said bulb, the housing having a plurality of apertures disposed about the longitudinal periphery of the housing, and a pair of resilient bulb mounting adapters between the housing and the bulb, the adapters being slidably positioned on the end members.

4. The device of claim 3 wherein the ballast end members have a lip between said members end the bulb portion, said lip providing stop means for the mounting adapters.

5. The device of claim 4 wherein the housing is adjustable in length, the adjustable housing comprising an apertured portion, at least one sleeve member slidable over the apertured portion of the housing and means for securing said sleeve to the apertured portion at any point thereon.

6. The device of claim 5 wherein the sleeve is threaded at one end and the sleeve securing means is comprised of a tubular member threaded at one end and a resilient tube-up ring, the ring being between the tubular member and the apertured portion.

7. The device of claims 2 or 3 wherein the energizing means is a rechargable battery pack mounted on the bicycle frame and connected to the bulb by wire.

8. The device of claims 1 or 3 wherein the resilient handlebar mount is a T or Y-shaped hollow tubular sleeve, the run of the mount slidable over the handlebar, and the stem portion extending inwardly with respect to the bicycle, said stem portion being hemicylindrical at its distal end whereby the illumination means may be detachably clipped thereon, the radius of the illumination means being approximately the same as the radius of the hemicylindrical stem portion.

9. The mount of claim 8 wherein the stem has a ball member at the end distil to the hemicylindrical end, said ball member being insertable within a neck extending from the sleeve, said stem then being freely rotatable about the neck.

10. The device of claims 1 or 3 wherein the resilient handlebars, mount is a hollow tubular sleeve slidable over the handlebars, said sleeve having an upwardly projecting socket as the support surface for the illumination means.

11. The mount of claim 10 wherein the socket has a ball member below the support surface, said ball member being insertable within a neck extending from the sleeve, said socket then being freely rotatable about the socket.

12. The device of claims 1 or 3 wherein the mount is a spring clip having at least two superposed hemicylindrical support surfaces, one support surface being attachable to the handlebar or handlebar reinforcing rod and another support surface providing means for clip-on attachment of the illumination means.

* * * * *